(12) United States Patent
Villars et al.

(10) Patent No.: US 9,123,054 B1
(45) Date of Patent: Sep. 1, 2015

(54) METHOD AND SYSTEM FOR MAINTAINING PRIVACY IN SCORING OF CONSUMER SPENDING BEHAVIOR

(71) Applicant: MasterCard International Incorporated, Purchase, NY (US)

(72) Inventors: Curtis Villars, Chatham, NJ (US); Serge Bernard, Danbury, CT (US); Todd Lowenberg, Redding, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 14/333,971

(22) Filed: Jul. 17, 2014

(51) Int. Cl.
*G06K 5/00* (2006.01)
*G06Q 30/02* (2012.01)
*H04L 29/06* (2006.01)

(52) U.S. Cl.
CPC ........ *G06Q 30/0201* (2013.01); *H04L 63/0428* (2013.01); *G06Q 2220/10* (2013.01)

(58) Field of Classification Search
CPC ........... G06K 5/00; G06K 7/08; G06K 19/00; G06K 19/06; G06F 17/00
USPC .......................... 235/380, 492, 487, 375, 451
See application file for complete search history.

(56) References Cited

U.S. PATENT DOCUMENTS

2013/0068837 A1* 3/2013 Dollard .......................... 235/380
2013/0073859 A1* 3/2013 Carlson et al. ................ 713/176

* cited by examiner

*Primary Examiner* — Edwyn Labaze
(74) *Attorney, Agent, or Firm* — Buchanan Ingersoll & Rooney PC

(57) ABSTRACT

A method for maintaining consumer privacy in behavioral scoring includes a first computing system and a second computing system. The first computing system disguises consumer characteristics and maps disguised consumer characteristics to unencrypted account identifiers, and then transmits the data to the second computing system. The second computing system encrypts the account identifiers upon receipt, and maps the encrypted account identifiers to anonymous transaction data. The second computing system uses the transaction data to calculate consumer behavioral scores, and then generates a scoring algorithm that uses disguised consumer characteristics to calculate consumer behavior scores based on the calculated consumer behavioral scores and corresponding disguised consumer characteristics. The generated algorithm is then returned to the first computing system, with the second computing system not receiving any unencrypted account identifiers, any undisguised consumer characteristics, or any personally identifiable information.

30 Claims, 10 Drawing Sheets

METHOD AND SYSTEM FOR MAINTAINING PRIVACY IN SCORING OF CONSUMER SPENDING BEHAVIOR

FIELD

The present disclosure relates to the maintaining of consumer privacy in behavioral scoring, specifically the generating and use of scoring algorithms that can maintain privacy via the use of disguised consumer characteristics.

BACKGROUND

Many entities, such as merchants, advertisers, content providers, manufacturers, and more, are often greatly interested in finding out as much as they can about consumers. By learning more about consumers, these entities can often better target advertisements, offers, or other content to consumers, or better select consumers for receipt of specific content. As a result, these entities may try to obtain information on consumers as often as possible, and with as much detail included as possible. One such piece of information is transaction data associated with payment transactions involving a consumer. Such information may be useful for identifying a consumer's purchasing behavior and shopping trends.

However, consumers may be worried about the amount of information that advertisers and other such entities may possess about themselves, particularly when it comes to their shopping behavior. As a result, many regulations have been passed and/or adopted that may limit an entity's ability to gather and/or possess personally identifiable information associated with a particular consumer. Therefore, entities are now often in need for information about consumers that can provide valuable detail, while still maintaining a consumer's privacy as per regulations and requirements.

Thus, there is a need for a technical solution to provide behavioral scores for consumers based on transaction data while maintaining consumer privacy.

SUMMARY

The present disclosure provides a description of systems and methods for the maintaining of consumer privacy in behavioral scoring.

A method for maintaining consumer privacy in behavioral scoring includes: storing, in a memory of a first computing system, a plurality of account identifiers, wherein each account identifier is associated with a payment account corresponding to a consumer; receiving, by a receiver of the first computing system, transmitted data, wherein the transmitted data includes at least a behavior prediction request and a data file including at least a plurality of first encrypted account identifiers, wherein each first encrypted account identifier is encrypted using a first one-way encryption and is associated with a payment account corresponding to a consumer, and further including, for each first encrypted account identifier, a set of consumer characteristics associated with the consumer corresponding to the associated payment account; disguising, by a processor of the first computing system, each set of consumer characteristics included in the received data file such that the respective set of consumer characteristics is not personally identifiable; mapping, in the memory of the first computing system, each of the plurality of first encrypted account identifiers and corresponding disguised set of consumer characteristics to an account identifier of the plurality of account identifiers; transmitting, by a transmitter of the first computing system, at least each account identifier and mapped first encrypted account identifier and corresponding disguised set of consumer characteristics to a second computing system, wherein a receiver of the second computing system is configured to encrypt each account identifier into a second encrypted account identifier using a second one-way encryption upon receipt; receiving, by the receiver of the second computing system, a plurality of transaction data entries, wherein each transaction data entry includes data related to a payment transaction including at least a second encrypted account identifier and transaction data; generating, by a processor of the second computing system, an algorithm configured to calculate a behavior prediction score corresponding to the behavior prediction request using disguised consumer characteristic values, wherein the generated algorithm is based on at least the transaction data included in each received transaction data entry and the disguised set of consumer characteristics mapped to the second encrypted account identifier included in the respective transaction data entry, wherein the second computing system does not receive any unencrypted account identifiers, any undisguised consumer characteristics, or any personally identifiable information.

Another method for maintaining consumer privacy in behavioral scoring includes: storing, in a memory of a first computing system, a plurality of account identifiers, wherein each account identifier is associated with a payment account corresponding to a consumer; receiving, by a receiver of a first computing system, transmitted data, wherein the transmitted data includes at least a behavior prediction request and a data file including at least a plurality of first encrypted account identifiers, wherein each first encrypted account identifier is encrypted using a first one-way encryption and is associated with a payment account corresponding to a consumer, and further including, for each first encrypted account identifier, a set of consumer characteristics associated with the consumer corresponding to the associated payment account; disguising, by a processor of the first computing system, each set of consumer characteristics included in the received data file such that the respective set of consumer characteristics is not personally identifiable; mapping, in the memory of the first computing system, each of the plurality of first encrypted account identifiers and corresponding disguised set of consumer characteristics to an account identifier of the plurality of account identifiers; transmitting, by a transmitter of the first computing system, at least each account identifier and mapped first encrypted account identifier to a second computing system, wherein a receiver of the second computing system is configured to encrypt each account identifier into a second encrypted account identifier using a second one-way encryption upon receipt; receiving, by the receiver of the second computing system, a plurality of transaction data entries, wherein each transaction data entry includes data related to a payment transaction including at least a second encrypted account identifier and transaction data; calculating, by a processor of the second computing system, a behavior prediction score corresponding to the behavior prediction request for each second encrypted account identifier based on at least the transaction data included in each transaction data entry including the respective second encrypted account identifier; and transmitting, by a transmitter of the second computing system, the calculated behavior prediction score for each second encrypted account identifier, wherein the second computing system does not receive any unencrypted account identifiers, any undisguised consumer characteristics, or any personally identifiable information.

A system for maintaining consumer privacy in behavioral prediction scoring includes a first computing system and a second computing system. The first computing system includes: a memory configured to store a plurality of account identifiers, wherein each account identifier is associated with a payment account corresponding to a consumer; a receiver configured to receive transmitted data, wherein the transmitted data includes at least a behavior prediction request and a data file including at least a plurality of first encrypted account identifiers, wherein each first encrypted account identifier is encrypted using a first one-way encryption and is associated with a payment account corresponding to a consumer, and further including, for each first encrypted account identifier, a set of consumer characteristics associated with the consumer corresponding to the associated payment account; a processor; and a transmitter. The processor is configured to: disguise each set of consumer characteristics included in the received data file such that the respective set of consumer characteristics is not personally identifiable; and map each of the plurality of first encrypted account identifiers and corresponding disguised set of consumer characteristics to an account identifier of the plurality of account identifiers. The transmitter is configured to transmit at least each account identifier and mapped first encrypted account identifier and corresponding disguised set of consumer characteristics to a second computing system, wherein a receiver of the second computing system is configured to encrypt each account identifier into a second encrypted account identifier using a second one-way encryption upon receipt. The second computing system includes: a receiver configured to receive a plurality of transaction data entries, wherein each transaction data entry includes data related to a payment transaction including at least a second encrypted account identifier and transaction data; and a processor configured to generate an algorithm configured to calculate a behavior prediction score corresponding to the behavior prediction request using disguised consumer characteristic values, wherein the generated algorithm is based on at least the transaction data included in each received transaction data entry and the disguised set of consumer characteristics mapped to the second encrypted account identifier included in the respective transaction data entry. The second computing system does not receive any unencrypted account identifiers, any undisguised consumer characteristics, or any personally identifiable information.

Another system for maintaining consumer privacy in behavioral scoring includes a first computing system and a second computing system. The first computing system includes: a memory configured to store a plurality of account identifiers, wherein each account identifier is associated with a payment account corresponding to a consumer; a receiver configured to receive transmitted data, wherein the transmitted data includes at least a behavior prediction request and a data file including at least a plurality of first encrypted account identifiers, wherein each first encrypted account identifier is encrypted using a first one-way encryption and is associated with a payment account corresponding to a consumer, and further including, for each first encrypted account identifier, a set of consumer characteristics associated with the consumer corresponding to the associated payment account; a processor; and a transmitter. The processor is configured to: disguise each set of consumer characteristics included in the received data file such that the respective set of consumer characteristics is not personally identifiable; and map, in the memory of the first computing system, each of the plurality of first encrypted account identifiers and corresponding disguised set of consumer characteristics to an account identifier of the plurality of account identifiers. The transmitter is configured to transmit at least each account identifier and mapped first encrypted account identifier to a second computing system, wherein a receiver of the second computing system is configured to encrypt each account identifier into a second encrypted account identifier using a second one-way encryption upon receipt. The second computing system includes: a receiver configured to receive a plurality of transaction data entries, wherein each transaction data entry includes data related to a payment transaction including at least a second encrypted account identifier and transaction data; a processor configured to calculate a behavior prediction score corresponding to the behavior prediction request for each second encrypted account identifier based on at least the transaction data included in each transaction data entry including the respective second encrypted account identifier, and a transmitter configured to transmit the calculated behavior prediction score for each second encrypted account identifier. The second computing system does not receive any unencrypted account identifiers, any undisguised consumer characteristics, or any personally identifiable information.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Figure 1:
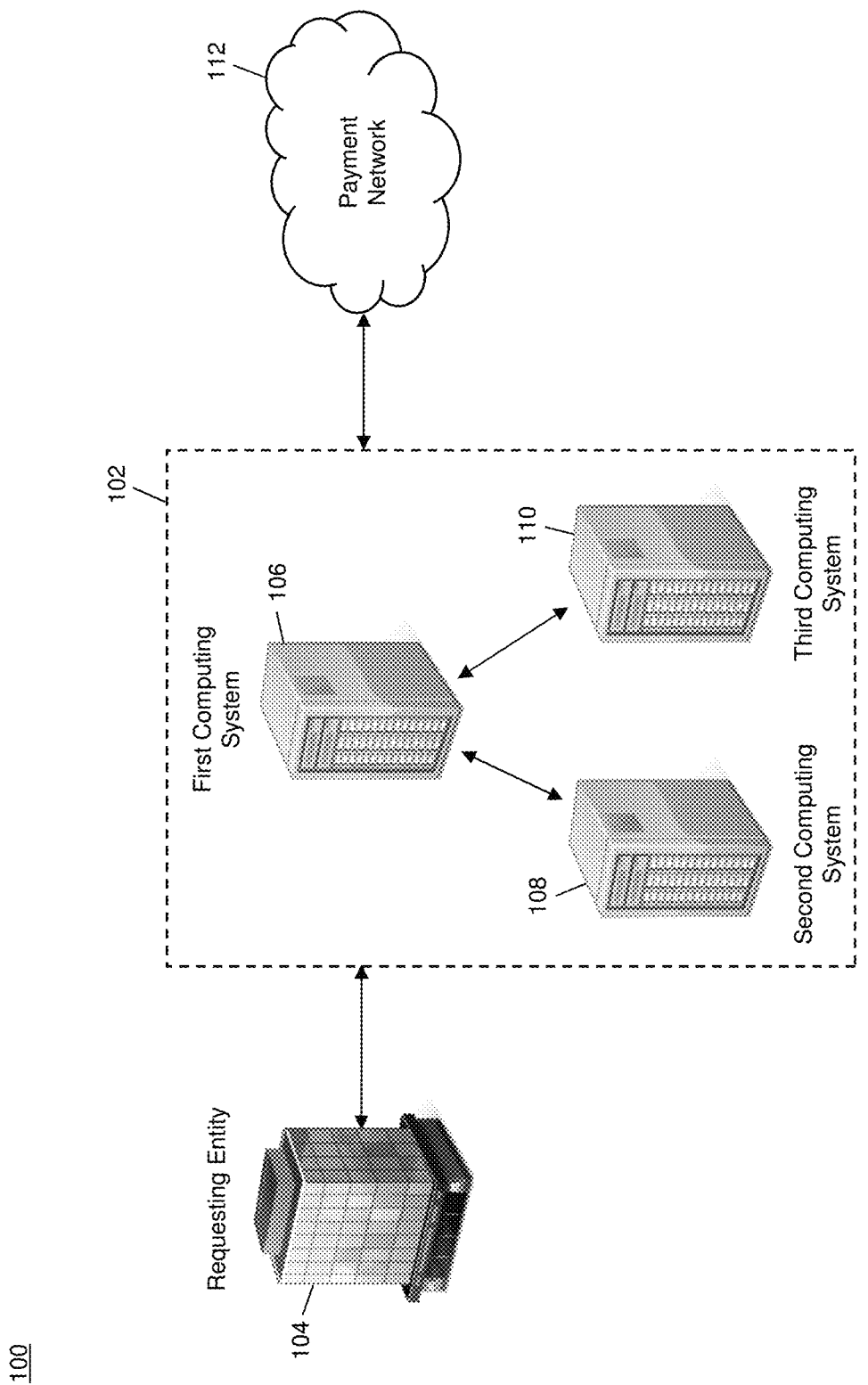
FIG. 1 is a high level architecture illustrating a system for maintaining consumer privacy in behavioral scoring in accordance with exemplary embodiments.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Payment Network—A system or network used for the transfer of money via the use of cash-substitutes. Payment networks may use a variety of different protocols and procedures in order to process the transfer of money for various types of transactions. Transactions that may be performed via a payment network may include product or service purchases, credit purchases, debit transactions, fund transfers, account withdrawals, etc. Payment networks may be configured to perform transactions via cash-substitutes, which may include payment cards, letters of credit, checks, financial accounts, etc. Examples of networks or systems configured to perform as payment networks include those operated by Master-Card®, VISA®, Discover®, American Express®, PayPal®, etc. Use of the term "payment network" herein may refer to both the payment network as an entity, and the physical payment network, such as the equipment, hardware, and software comprising the payment network.

Personally identifiable information (PII)—PII may include information that may be used, alone or in conjunction with other sources, to uniquely identify a single individual. Information that may be considered personally identifiable may be defined by a third party, such as a governmental agency (e.g., the U.S. Federal Trade Commission, the European Commission, etc.), a non-governmental organization (e.g., the Electronic Frontier Foundation), industry custom, consumers (e.g., through consumer surveys, contracts, etc.), codified laws, regulations, or statutes, etc. The present disclosure provides for methods and systems where the processing system 102 does not possess any personally identifiable information. Systems and methods apparent to persons having skill in the art for rendering potentially personally identifiable information anonymous may be used, such as bucketing. Bucketing may include aggregating information that may otherwise be personally identifiable (e.g., age, income, etc.) into a bucket (e.g., grouping) in order to render the information not personally identifiable. For example, a consumer of age 26 with an income of $65,000, which may otherwise be unique in a particular circumstance to that consumer, may be represented by an age bucket for ages 21-30 and an income bucket for incomes $50,000 to $74,999, which may represent a large portion of additional consumers and thus no longer be personally identifiable to that consumer. In other embodiments, encryption may be used. For example, personally identifiable information (e.g., an account number) may be encrypted (e.g., using a one-way encryption) such that the processing system 102 may not possess the PII or be able to decrypt the encrypted PII.

System for Maintaining Privacy in Behavioral Scoring

FIG. 1 illustrates a system 100 for the maintaining of privacy in generating behavioral scoring algorithms and application thereof to consumer characteristic data.

The system 100 may include a processing system 102. The processing system 102 may be configured to generate scoring algorithms configured to generate behavioral scores based on consumer characteristics using the methods and systems discussed herein. The consumer characteristics may be demographics, such as age, gender, income, residential status, marital status, familial status, zip code, postal code, occupation, education, etc. or other suitable types of characteristics that may be associated with one or more consumers. The generated behavioral scores may be based on the consumer characteristics and may be indicative of the associated consumer or consumers' propensity for a certain type of purchase behavior.

For example, the processing system 102 may generate a scoring algorithm configured to score a consumer for their propensity to purchase electronic goods in the next thirty days, based on their consumer characteristics. The types of purchase behavior that may be indicated by a score calculated using a scoring algorithm generated using the methods and systems discussed herein may include propensities to spend at a specific merchant or merchants, in a specific industry or industries, at a specific geographic location, during a specified period of time, within a specified range of transaction amounts, any combination thereof, and any other behaviors that will be apparent to persons having skill in the relevant art.

In exemplary embodiments, the processing system 102 may include two or more computing systems and may be configured such that no individual computing system included in the processing system 102 may possess unencrypted transaction data and personally identifiable information at the same time. In a first embodiment, discussed in more detail below, the processing system 102 may include a first computing system 106 and a second computing system 108. In another embodiment, also discussed in more detail below, the processing system 102 may include a first computing system 106, a second computing system 108, and a third computing system 110. The computing systems 106, 108, and 110 discussed in more detail below, may be configured to perform the steps disclosed herein for the generation of scoring algorithms and the calculation of behavioral scores.

The system 100 may further include a requesting entity 104. The requesting entity 104 may be an entity that is requesting a scoring algorithm for calculating behavioral scores, or the behavioral scores themselves, for a plurality of consumers. The requesting entity 104 may transmit data to the processing system 102 (e.g., to be received by the first computing system 106, which may not possess any personally identifiable information), which may include consumer characteristics for each of a plurality of consumers, and encrypted account identifiers for each of the plurality of consumers.

In some embodiments, the processing system 102 may be configured to disguise the consumer characteristics to anonymize the data such that it may not be personally identifiable. In one such embodiment, the first computing system 106 may disguise the variables and/or values for each of the consumer characteristics. For example, the consumer characteristics may include demographics, including a gender variable that has a value of male or female for each consumer. The first computing system 106 may, after the data has been received from the requesting entity 104, disguise both the variable, gender, and the values, male or female, such that the information may not be used to personally identify the related consumer, such as replacing the gender variable with "X1" and replacing the male and female values with "A" and "B," respectively.

The disguised values may then be used by the second computing system 108 and/or third computing system 110 to generate a scoring algorithm based on transaction data. Transaction data may be received from a payment network 112. The payment network 112 may receive and store transaction data as part of the processing of payment transactions using methods and systems that will be apparent to persons having skill in the relevant art. The payment network 112 may provide the transaction data to the processing system 102, which may be received by one of the included computing systems. In an exemplary embodiment, the transaction data may be received by the second computing system 108 and/or third computing system 110, but not the first computing system 106, such that no computing system in the processing system 102 possess both transaction data and personally identifiable information. In such embodiments, the transaction data may include only encrypted account identifiers and may not include any unencrypted account information.

As discussed in more detail below, scoring algorithms may be generated for a specified type of consumer purchase behavior by the second computing system 108 and/or third computing system 110 using the received transaction data, and may use disguised consumer characteristic variables and values as part of the algorithm. For example, the algorithm may use disguised variable X1 as an input for part of the score calculation, and may expect a value of A or B for the variable. The scoring algorithm using the disguised characteristics as inputs may be generated using transaction data for accounts and disguised characteristics associated with each respective account. As discussed in more detail below, the transaction data and disguised characteristics may be matched in the second computing system 108 and/or third computing system 110 using encrypted account identifiers such that no computing system in the processing system 102 possess both undisguised characteristic data and transaction data.

The processing system 102 may be further configured to transmit a generated scoring algorithm back to the requesting entity 104 in response to an earlier request. In instances where the requesting entity 104 is requesting behavioral scores, the processing system 102 may first score each of the accounts for which characteristic data was received using the generated scoring algorithm, and may return the scores to the requesting entity 104. In some embodiments, the first computing system 106 may undisguise the characteristics included in the generated algorithm prior to transmission to the requesting entity 104.

Methods and systems discussed herein may thereby be enable to generate scoring algorithms using for identifying behavioral scores for consumers based on consumer characteristics, while maintaining a high level of consumer privacy via the use of multiple computing systems. By partitioning the processing system 102 into multiple computing systems, none of which possess both transaction data and any personally identifiable information, the processing system 102 may be able to accurately generate scoring algorithms without compromising consumer privacy.

Computing Systems

Figure 2:
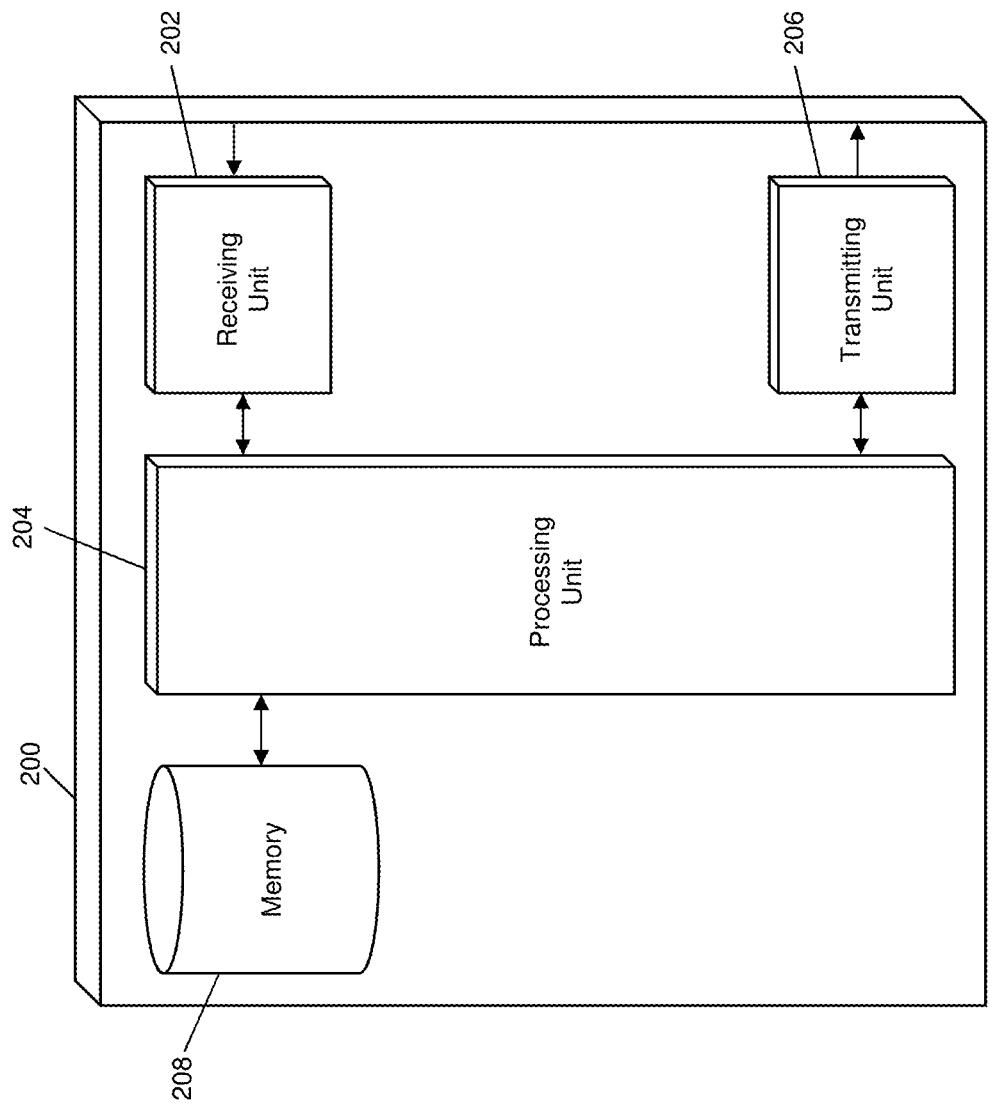
FIG. 2 is a block diagram illustrating a computing system for use in the system of FIG. 1 for the generation of behavioral scoring algorithms while maintaining consumer privacy in accordance with exemplary embodiments.

FIG. 2 illustrates an embodiment of a computing system 200 of the system 100. It will be apparent to persons having skill in the relevant art that the embodiment of the computing system 200 illustrated in FIG. 2 is provided as illustration only and may not be exhaustive to all possible configurations of computing system 200 suitable for performing the functions as discussed herein. For example, the computer system 700 illustrated in FIG. 7 and discussed in more detail below may be a suitable configuration of the computing system 200.

The computing system 200 illustrated in FIG. 2 and discussed herein may be representative of each of the computing systems 106, 108, and 110 included in the processing system 102. While it is discussed herein that each of the computing systems 106, 108, and 110 may each include the same components of the computing system 200 illustrated in FIG. 2, it will be apparent to persons having skill in the relevant art that the computing systems 106, 108, and 110 may each include different and/or additional components than those illustrated in the computing system 200, and that each of the computing systems 106, 108, and 110 may include configurations different from the computing system 200 illustrated in FIG. 2.

The computing system 200 may include a receiving unit 202. The receiving unit 202 may be configured to receive data over one or more networks via one or more network protocols. The receiving unit 202 may thereby receive data from the requesting entity 104, which may include one or more data files including encrypted account identifiers and consumer characteristic data. Received data may also include behavior prediction criteria and/or scoring requests. The receiving unit 202 in some computing systems 200 may also be configured to receive transaction data from the payment network 112. In some instances, received transaction data may be associated with encrypted account identifiers and may not include any personally identifiable information.

In some computing systems 200, the receiving unit 202 may be configured to encrypt data upon receipt. For instance, the receiving unit 202 of the second computing system 108 may be configured to encrypt account identifiers upon receipt such that the second computing system 108 does not possess any unencrypted account identifiers. In such an instance, the encryption may be performed by the receiving unit 202, or may be performed by another component of the computing system 200 before the data is made available to the rest of the system, such as an encrypting unit.

Encryption performed by the receiving unit 202 or other unit may be a one-way encryption, such that the encrypted data may not be unencrypted. Suitable encryption algorithms and methods of encryption that may be used will be apparent to persons having skill in the relevant art, such as cryptographic hash functions (e.g., one or more of the SHA-2 set of cryptographic hash functions). In some instances, a salt may also be used as part of the encryption.

The computing system 200 may also include a processing unit 204. The processing unit 204 may be configured to perform the functions of each computing system as discussed herein. In some instances, encryption may be performed by the processing unit 204 in each respective computing system 200. The processing unit 204 may also be configured to identify associations in data received by the receiving unit 202 of the respective system. For instance, the processing unit 204 of the second computing system 108 may, as discussed below, be configured to match received transaction data with disguised consumer characteristics based on associated encrypted account identifiers.

The processing unit 204 may also be configured to generate scoring algorithms in some computing systems 200. Scoring algorithms may be generated based on transaction data and associated disguised consumer characteristics. In some embodiments, a scoring algorithm may be generated to provide a score representing a specific consumer behavior, which may be a consumer behavior indicated in a request received by the receiving unit 202 of a computing system 200 in the processing system 102. The processing unit 204 may also be configured to calculate behavior scores based on application of a generated scoring algorithm to a set of disguised or undisguised consumer characteristics.

In some computing systems 200, the processing unit 204 may also be configured to disguise consumer characteristics. Disguising consumer characteristics may include disguising variables and/or their values such that the corresponding undisguised variables and/or values may be unidentifiable to a computing system 200 that receives the corresponding disguised characteristics. For example, if a consumer characteristic is a demographic indicating a consumer's income, where their income is one of five predetermined ranges (e.g., less than $30,000, $30,001 to $50,000, $50,001 to $75,000, $75,001 to $100,000, and over $100,000), the processing unit 204 may disguise the values such that the characteristic of income may have a value of A, B, C, D, or E for a specific encrypted account identifier. In some instances, the variable itself may also be disguised, such that a computing system 200 may receive the characteristic as characteristic X3 has a value of A, B, C, D, or E for each encrypted account identifier.

In some instances, processing units 204 that are configured to disguised consumer characteristics may also be configured to undisguise consumer characteristics, such as in a received scoring algorithm. For example, the first computing system 106 may receive a scoring algorithm from the second computing system 108 that uses disguised variables and values, and the processing unit 204 of the first computing system 106 may undisguise the variables and values prior to providing the generated scoring algorithm to the requesting entity 104 in response to an initially received request.

Computing systems 200 may also include a transmitting unit 206. The transmitting unit 206 may be configured to transmit data over one or more networks via one or more network protocols. The transmitting unit 206 may be configured to transmit data from one computing system 200 in the processing system 102 to another computing system 200 in the processing system 102, such as the transmitting of disguised consumer characteristics from the first computing system 106 to the second computing system 108. The transmitting unit 206 may also be configured to transmit data from a computing system 200 included in the processing system 102 to a system outside of the processing system 102, such as the requesting entity 104 and/or the payment network 112. For example, the transmitting unit 206 of the first computing system 106 may be configured to transmit a generated scoring algorithm to the requesting entity 104.

Computing systems 200 may also include a memory 208. The memory 208 may be configured to store data suitable for performing the functions disclosed herein. For example, the second computing system 108 may be configured to store received transaction data in the memory 208 prior to mapping the received transaction data to disguised consumer characteristics. Data that may be stored in the memory 208 of various computing systems 200 in the processing system 102 will be apparent to persons having skill in the relevant art.

Two System Process for Maintaining Consumer Privacy in Behavioral Scoring

Figure 3A:
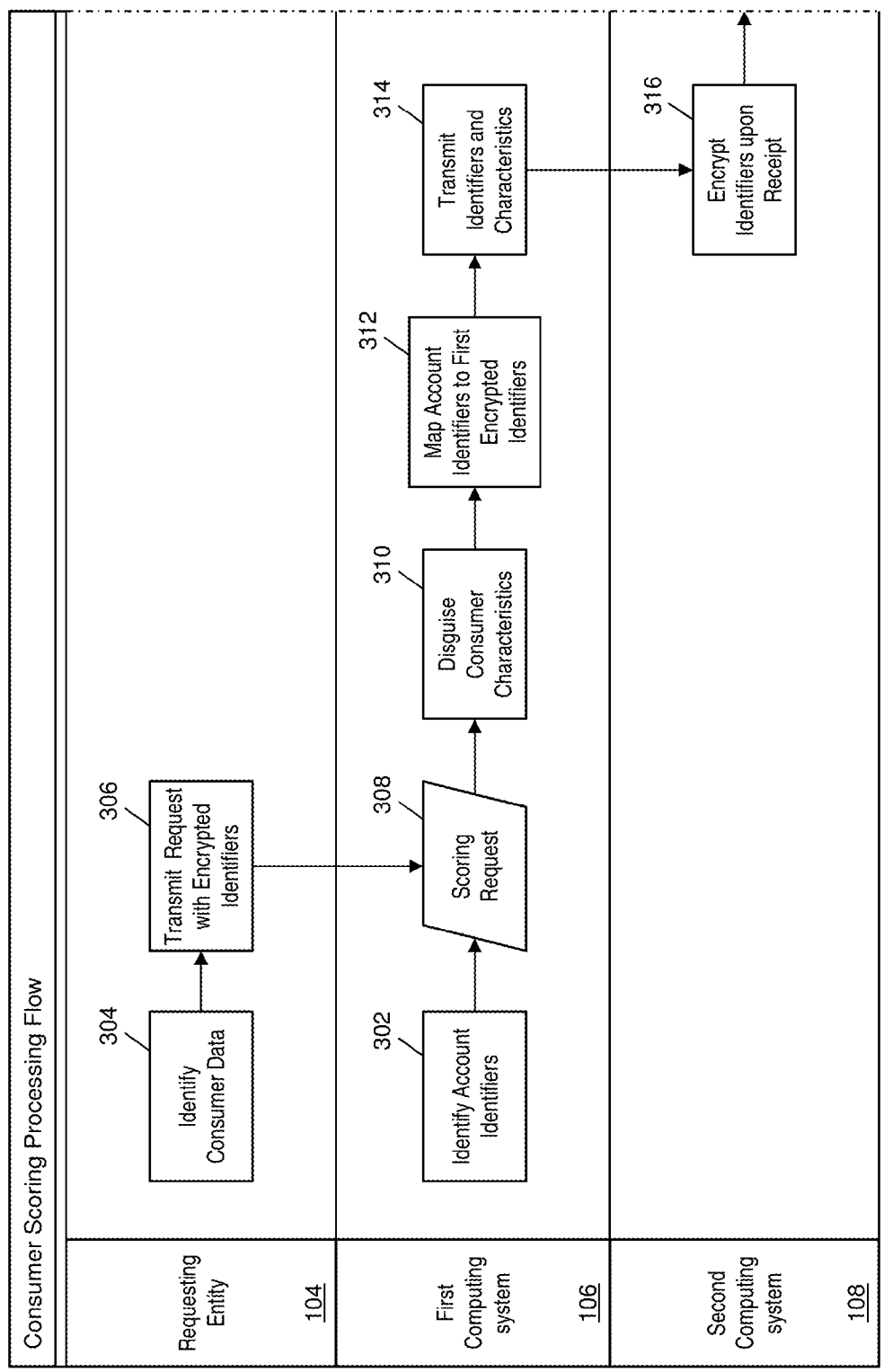
FIGS. 3A and 3B are flow diagrams illustrating a process for generating consumer behavioral scores while maintaining consumer privacy using two computing systems of the system 100 of FIG. 1, in accordance with exemplary embodiments.
Figure 3B:
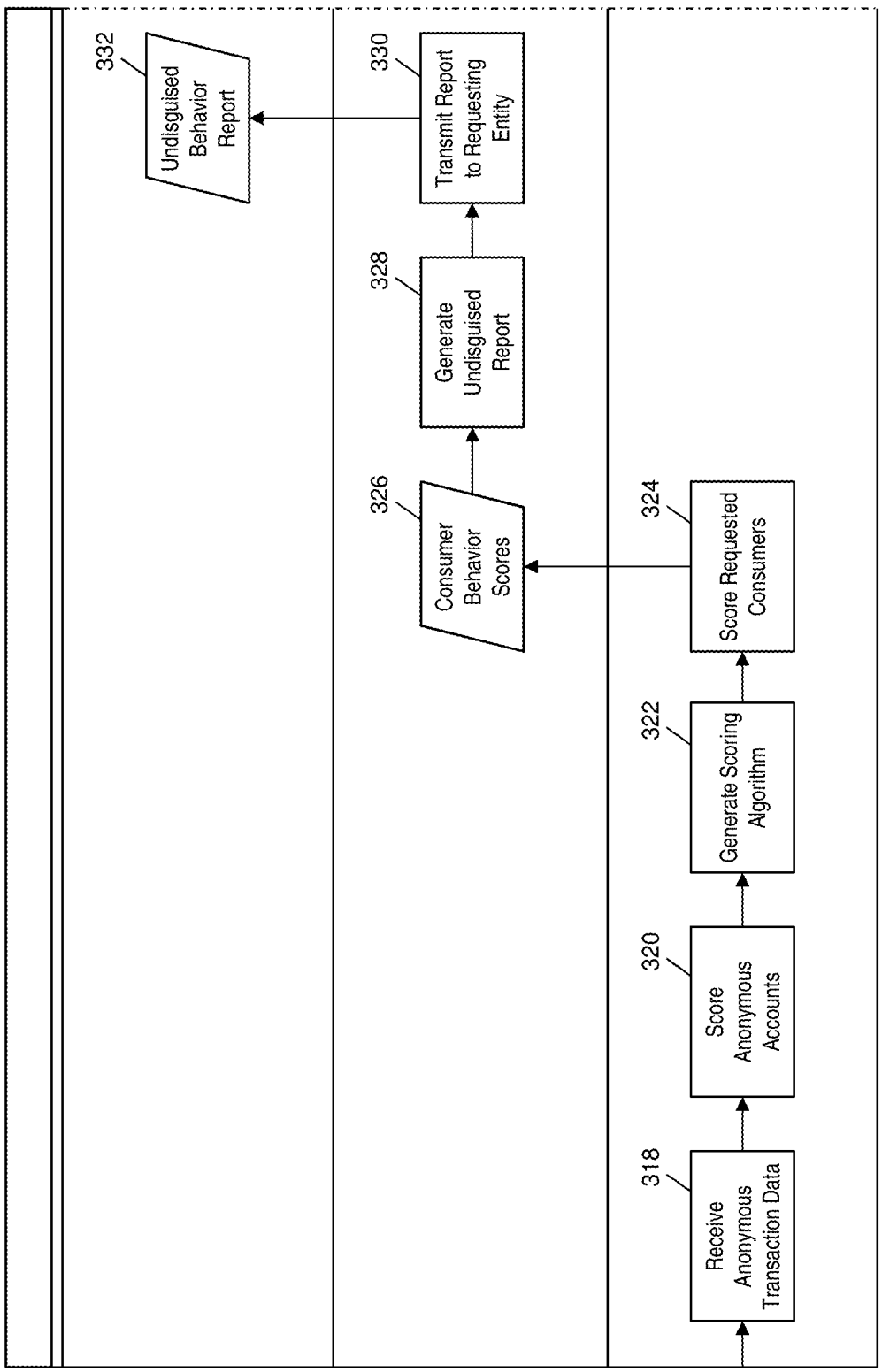

FIGS. 3A and 3B illustrate a process for maintaining consumer privacy in behavioral scoring using the first computing system 106 and second computing system 108 of the processing system 102.

In step 302, the first computing system 106 may identify (e.g., via the processing unit 204) account identifiers, wherein each account identifier is associated with a payment account corresponding to a consumer. In some instances, the account identifiers may be stored in the memory 208 of the first computing system 106. In step 304, the requesting entity 104 may identify consumer data for which behavioral scores are requested. The consumer data may include a plurality of consumer characteristics associated with each of a plurality of consumers, and an account identifier associated with each of the plurality of consumers.

In step 306, the requesting entity 104 may encrypt the account identifiers using a first one-way encryption and may transmit the encrypted account identifiers and corresponding consumer characteristic data to the first computing system 108. The transmitted data may also include a scoring request, which may include a behavior prediction request corresponding to a purchase behavior for which the requesting entity 104 wants consumers to be scored. In step 308, the receiving unit 202 of the first computing system 106 may receive the transmitted data.

In step 310, the processing unit 204 of the first computing system 106 may disguise the received consumer characteristics. In some embodiments, the variables or values of the consumer characteristics may be disguised. In other embodiments, both the variables and the values of each consumer characteristic may be disguised. In step 312, the processing unit 204 of the first computing system 106 may map the encrypted account identifiers received from the requesting entity with the account identifiers stored in the memory 208 and identified in step 302.

In step 314, the transmitting unit 206 of the first computing system 106 may transmit the unencrypted account identifiers and their mapped consumer characteristics to the second computing system 108. In step 316, the receiving unit 202 of the second computing system 108 may receive the identifiers and mapped consumer characteristics and may encrypt the account identifiers upon receipt using a second one-way encryption. In some embodiments, the second one-way encryption may be different than the first one-way encryption such that the encrypted account identifiers obtained by the second computing system 108 may be different than the encrypted account identifiers transmitted to the first computing system 106 by the requesting entity 104.

In step 318, the receiving unit 202 of the second computing system 108 may receive anonymous transaction data from the payment network 112. The anonymous transaction data may include transaction data for a plurality of payment transactions, wherein the transaction data for each payment transaction is associated with an encrypted account identifier corresponding to a payment account involved in the respective transaction, where the encrypted account identifier is encrypted using the second one-way encryption. In step 320, the processing unit 204 of the second computing system 108 may match the anonymous transaction data to disguised consumer characteristics based on the respective corresponding encrypted account identifiers, and may score each of the matched sets of data. The scoring may be a behavioral score corresponding to the requested purchase behavior, and may be based on the transaction data associated with each respective encrypted account identifier.

Once scores have been obtained that correspond to each encrypted account identifier, then, in step 322, the processing unit 204 of the second computing system 108 may generate a scoring algorithm for the requested purchase behavior. The generated scoring algorithm may be configured to calculate a behavioral score for a consumer based on disguised consumer characteristics associated with that consumer. Accordingly, the scoring algorithm may be generated based on the behavioral score for each encrypted account identifier and the corresponding disguised consumer characteristics.

In step 324, the processing unit 204 of the second computing system 108 may be configured to calculate a behavioral score for each of the requested consumers using the generated scoring algorithm. In some instances, the calculated score may be the same score identified for each consumer in step 320. The transmitting unit 206 of the second computing system 108 may transmit the consumer behavior scores to the first computing system 106.

In step 326, the receiving unit 202 of the first computing system 106 may receive the consumer behavior scores. In step 328, the processing unit 204 of the first computing system 106 may generate a report of the calculated consumer behavior scores. In some instances, the generated report may include the generated scoring algorithm or other information that may include disguised consumer characteristics. In such an instance, step 328 may further include undisguising the disguised consumer characteristics. In step 330, the transmitting unit 206 of the first computing system 106 may transmit the generated report to the requesting entity 104 in response to the originally received scoring request. In step 332, the requesting entity 104 may receive the generated report.

In some embodiments, the requesting entity 104 may request the generated scoring algorithm and not behavioral scores calculated using the algorithm. In such an embodiment, steps 324 and 326 may not be performed, and the report generated in step 328 may include the generated scoring algorithm transmitted from the second computing system 108 to the first computing system 106, without any calculated behavioral scores included.

Three System Process for Maintaining Consumer Privacy in Behavioral Scoring

Figure 4A:
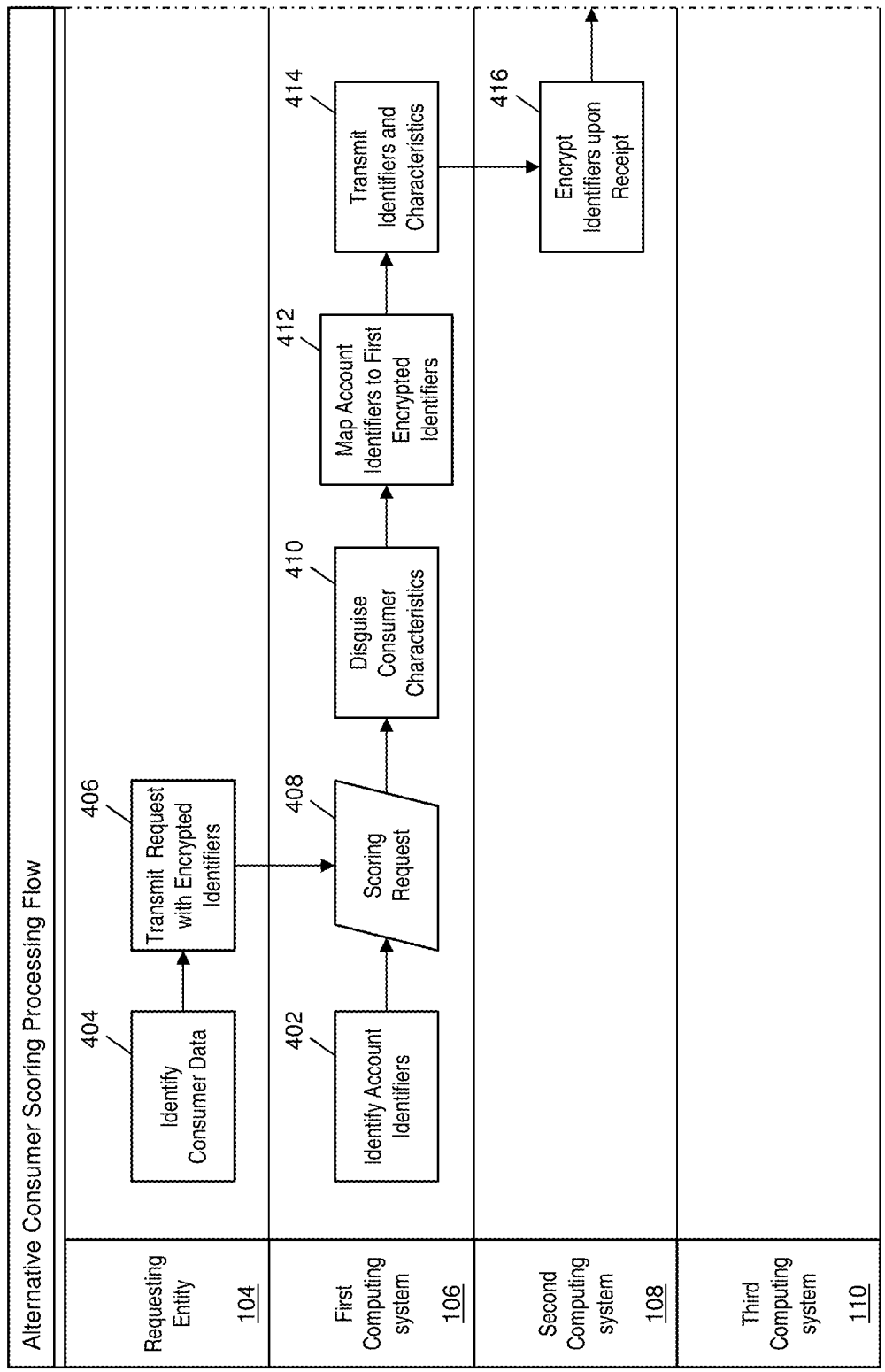
FIGS. 4A-4C are flow diagrams illustrating a process for generating consumer behavioral scores while maintaining consumer privacy using three computing systems of the system 100 of FIG. 1, in accordance with exemplary embodiments.
Figure 4B:
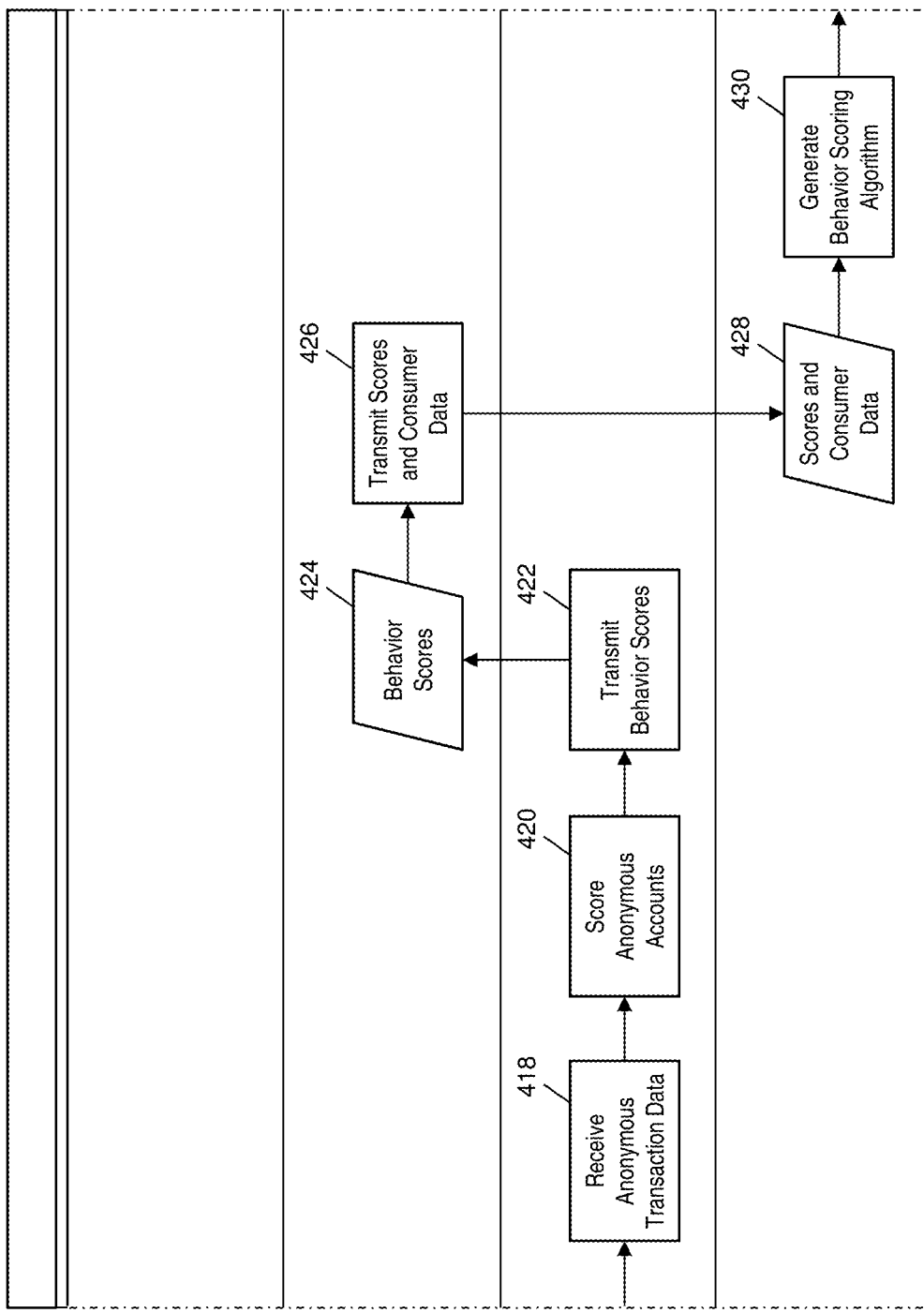
Figure 4C:
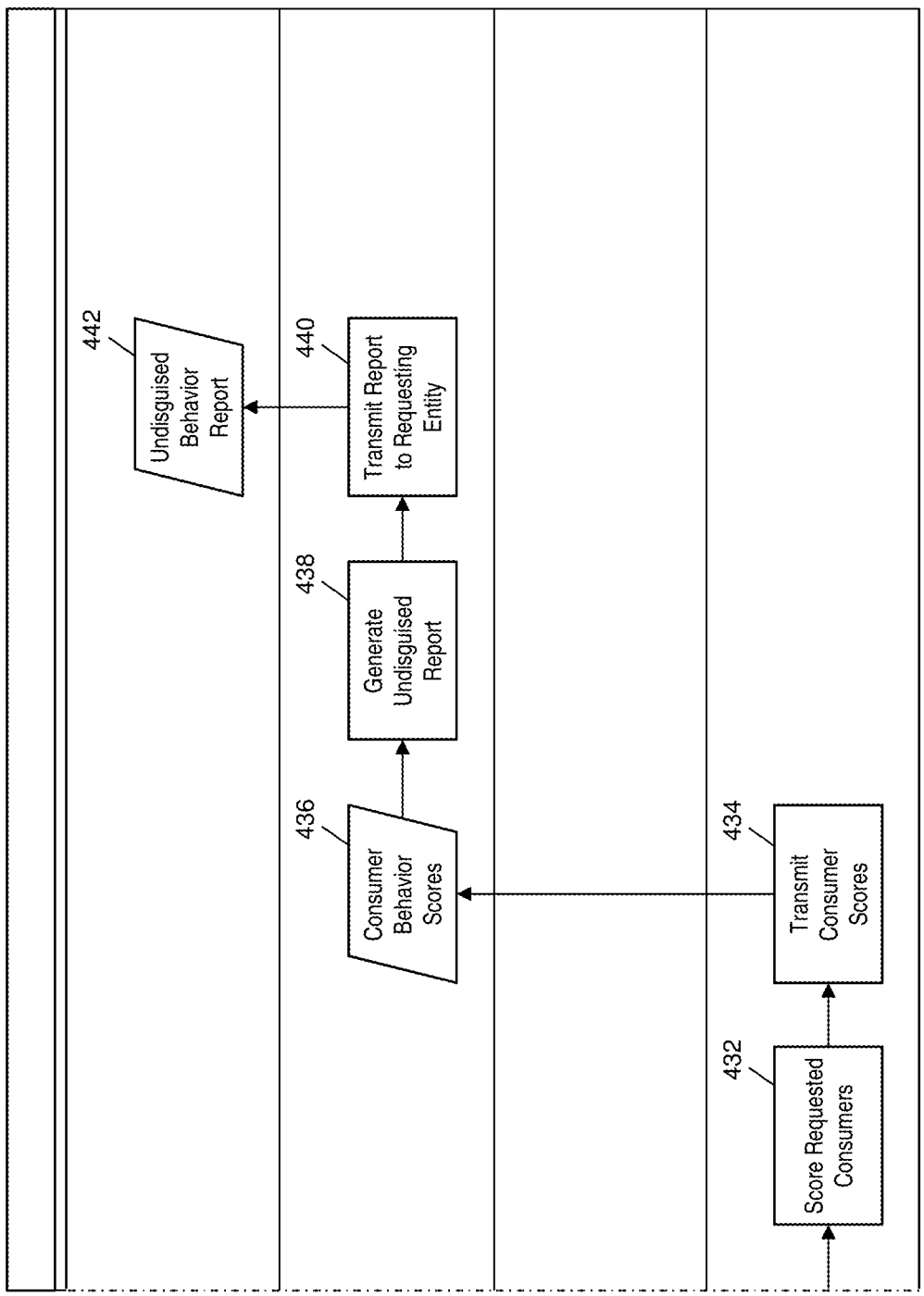

FIGS. 4A-4C illustrate a process for maintaining consumer privacy in behavioral scoring using the first computing system 106, second computing system 108, and third computing system 110 of the processing system 102.

In step 402, the first computing system 106 may identify (e.g., via the processing unit 204) account identifiers, wherein each account identifier is associated with a payment account corresponding to a consumer. In some instances, the account identifiers may be stored in the memory 208 of the first computing system 106. In step 404, the requesting entity 104 may identify consumer data for which behavioral scores are requested. The consumer data may include a plurality of consumer characteristics associated with each of a plurality of consumers, and an account identifier associated with each of the plurality of consumers.

In step 406, the requesting entity 104 may encrypt the account identifiers using a first one-way encryption and may transmit the encrypted account identifiers and corresponding consumer characteristic data to the first computing system 106. The transmitted data may also include a scoring request, which may include a behavior prediction request corresponding to a purchase behavior for which the requesting entity 104 wants consumers to be scored. In step 408, the receiving unit 202 of the first computing system 106 may receive the transmitted data.

In step 410, the processing unit 204 of the first computing system 106 may disguise the received consumer characteristics. In some embodiments, the variables or values of the consumer characteristics may be disguised. In other embodiments, both the variables and the values of each consumer characteristic may be disguised. In step 412, the processing unit 204 of the first computing system 106 may map the encrypted account identifiers received from the requesting entity with the account identifiers stored in the memory 208 and identified in step 402.

In step 414, the transmitting unit 206 of the first computing system 106 may transmit the unencrypted account identifiers and their mapped consumer characteristics to the second computing system 108. In step 416, the receiving unit 202 of the second computing system 108 may receive the unencrypted account identifiers and mapped consumer characteristics and may encrypt the account identifiers upon receipt using a second one-way encryption. In some embodiments, the second one-way encryption may be different than the first one-way encryption such that the encrypted account identifiers obtained by the second computing system 108 may be different than the encrypted account identifiers transmitted to the first computing system 106 by the requesting entity 104 in step 406.

In step 418, the receiving unit 202 of the second computing system 108 may receive anonymous transaction data from the payment network 112. The anonymous transaction data may include transaction data for a plurality of payment transactions, wherein the transaction data for each payment transaction is associated with an encrypted account identifier corresponding to a payment account involved in the respective transaction, where the encrypted account identifier is encrypted using the second one-way encryption. In step 420, the processing unit 204 of the second computing system 108 may match the anonymous transaction data to disguised consumer characteristics based on the respective corresponding encrypted account identifiers, and may score each of the matched sets of data. The scoring may be a behavioral score corresponding to the requested purchase behavior, and may be based on the transaction data associated with each respective encrypted account identifier.

In step 422, the transmitting unit 206 of the second computing system 108 may transmit the calculated behavioral scores for each disguised set of consumer characteristics to the first computing system 106. In step 424, the receiving unit 202 of the first computing system 106 may receive the calculated behavior score for each disguised set of consumer characteristics. In step 426, the transmitting unit 206 of the first computing system 106 may transmit the disguised sets of consumer characteristics and corresponding behavior scores to the third computing system 110.

In step 428, the receiving unit 202 of the third computing system 110 may receive the disguised consumer characteristics and corresponding behavior scores. In step 430, the processing unit 204 of the third computing system 110 may generate a scoring algorithm for the requested purchase behavior. The generated scoring algorithm may be configured to calculate a behavioral score for a consumer based on disguised consumer characteristics associated with that consumer. Accordingly, the scoring algorithm may be generated based on each set of disguised consumer characteristics and the corresponding behavioral score.

In step 432 the processing unit 204 of the third computing system 110 may be configured to calculate a behavioral score for each of the requested consumers using the generated scoring algorithm. In some instances, the calculated score may be the same score previously identified for each consumer and received by the third computing system 110 in step 428. In step 434, the transmitting unit 206 of the third computing system 110 may transmit the consumer behavior scores to the first computing system 106.

In step 436, the receiving unit 202 of the first computing system 106 may receive the consumer behavior scores. In step 438, the processing unit 204 of the first computing system 106 may generate an undisguised report of the calculated consumer behavior scores. In some instances, the generated report may include the generated scoring algorithm or other information that may include disguised consumer characteristics. In such an instance, step 438 may further include undisguising the disguised consumer characteristics. In step 440, the transmitting unit 206 of the first computing system 106 may transmit the generated report to the requesting entity 104 in response to the originally received scoring request. In step 442, the requesting entity 104 may receive the generated report.

In some embodiments, the requesting entity 104 may request the generated scoring algorithm and not behavioral scores calculated using the algorithm. In such an embodiment, steps 432-436 may not be performed, and the report generated in step 438 may include the generated scoring algorithm transmitted from the third computing system 110 to the first computing system 106, without any calculated behavioral scores included.

First Exemplary Method for Maintaining Consumer Privacy in Behavioral Scoring

Figure 5:
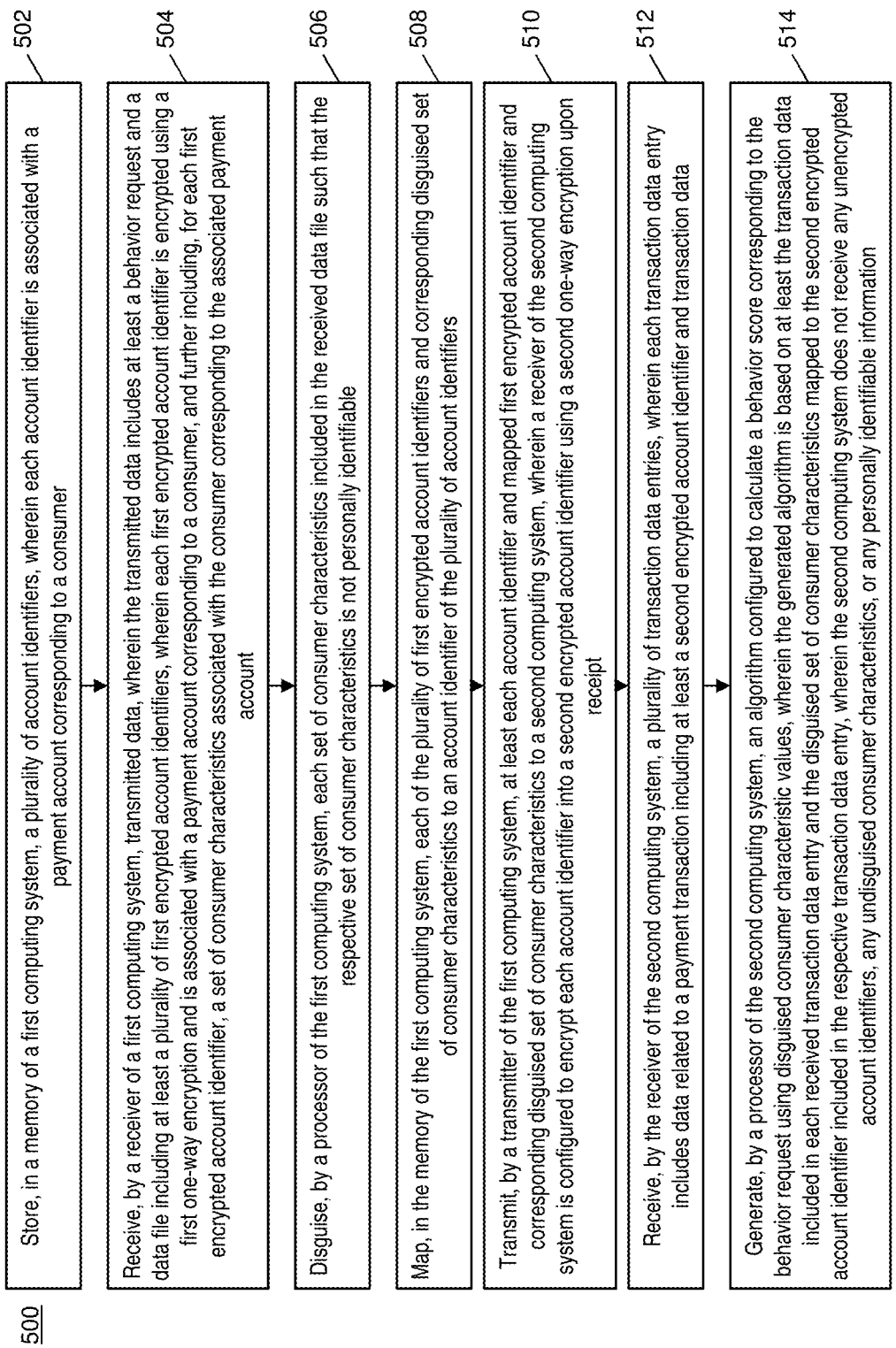
FIGS. 5 and 6 are flow charts illustrating exemplary methods for maintaining consumer privacy in behavioral scoring in accordance with exemplary embodiments.

FIG. 5 illustrates a method 500 for the maintaining of consumer privacy in behavioral scoring using two computing systems.

In step 502, a plurality of account identifiers may be stored in a memory (e.g., the memory 208) of a first computing system (e.g., the first computing system 106), wherein each account identifier is associated with a payment account corresponding to a consumer. In step 504, transmitted data may be received by a receiver (e.g., the receiving unit 202) of the first computing system 106, wherein the transmitted data includes at least a behavior prediction request and a data file including at least a plurality of first encrypted account identifiers, wherein each first encrypted account identifier is encrypted using a first one-way encryption and is associated with a payment account corresponding to a consumer, and further including, for each first encrypted account identifier, a set of consumer characteristics associated with the consumer corresponding to the associated payment account.

In step 506, each set of consumer characteristics included in the received data file may be disguised by a processor (e.g., the processing unit 204) of the first computing system 106 such that the respective set of consumer characteristics is not personally identifiable. In some embodiments, the set of consumer characteristics may include variables and values, and disguising each set of consumer characteristics may include disguising at least the included variables. In step 508, each of the plurality of first encrypted account identifiers and corresponding disguised set of consumer characteristics may be mapped to an account identifier of the plurality of account identifiers in the memory 208 of the first computing system 106.

In step 510, at least each account identifier and mapped first encrypted account identifier and corresponding disguised set of consumer characteristics may be transmitted by a transmitter (e.g., the transmitting unit 206) of the first computing system 106 to a second computing system (e.g., the second computing system 108), wherein a receiver (e.g., the receiving unit 202) of the second computing system 108 is configured to encrypt each account identifier into a second encrypted account identifier using a second one-way encryption upon receipt. In step 512, a plurality of transaction data entries may be received by the receiving unit 202 of the second computing system 108, wherein each transaction data entry includes data related to a payment transaction including at least a second encrypted account identifier and transaction data.

In step 514, an algorithm may be generated by a processor (e.g., the processing unit 204) of the second computing system 108 configured to calculate a behavior prediction score corresponding to the behavior prediction request using disguised consumer characteristic values, wherein the generated algorithm is based on at least the transaction data included in each received transaction data entry and the disguised set of consumer characteristics mapped to the second encrypted account identifier included in the respective transaction data entry, wherein the second computing system 108 does not receive any unencrypted account identifiers, any undisguised consumer characteristics, or any personally identifiable information.

In one embodiment, the method 500 may further include calculating, by the processor 204 of the second computing system 108, a behavior prediction score for each first encrypted account identifier by application of the corresponding disguised set of consumer characteristics to the generated algorithm, and transmitting, by a transmitter (e.g., transmitting unit 206) of the second computing system 108, at least the calculated behavior prediction score for each first encrypted account identifier and the corresponding first encrypted account identifier. In a further embodiment, the calculated behavior prediction score for each first encrypted account identifier and the corresponding first encrypted account identifier may be transmitted to the first computing system 106, and the method 500 may even further include: receiving, by the receiving unit 202 of the first computing system 106, the calculated behavior prediction score for each first encrypted account identifier; and transmitting, by the transmitting unit 206 of the first computing system 106, the calculated behavior prediction score for each first encrypted account identifier and the corresponding first encrypted account identifier in response to the received transmitted data.

In some embodiments, the method 500 may further include transmitting, by the transmitting unit 206 of the second computing system 106, the generated algorithm. In a further embodiment, the generated algorithm may be transmitted in response to the received transmitted data. In another further embodiment, the method 500 may even further include: receiving, by the receiver of the first computing system, the generated algorithm; modifying, by the processor of the first computing system, the generated algorithm such that the modified algorithm is configured to calculate a behavior prediction score corresponding to the behavior prediction request using undisguised consumer characteristic values; and transmitting, by the transmitter of the first computing system, at least the modified algorithm in response to the received transmitted data.

Second Exemplary Method for Maintaining Consumer Privacy in Behavioral Scoring

Figure 6:
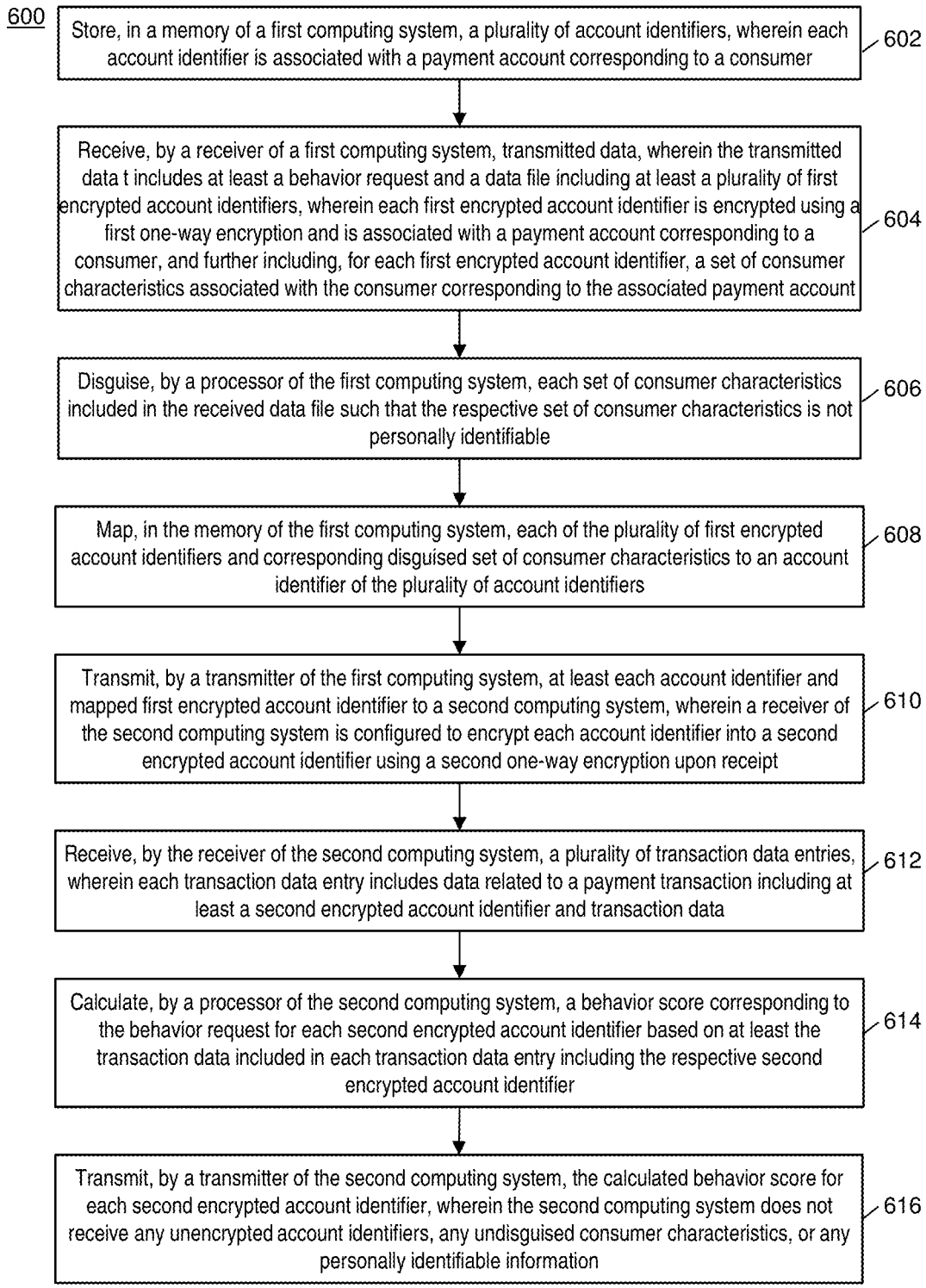

FIG. 6 illustrates a method 600 for the maintaining of consumer privacy in behavioral scoring using three computing systems.

In step 602, a plurality of account identifiers may be stored in a memory (e.g., the memory 208) of a first computing system (e.g., the first computing system 106), wherein each account identifier is associated with a payment account corresponding to a consumer. In step 604, transmitted data may be received by a receiver (e.g., the receiving unit 202) of the first computing system 106, wherein the transmitted data includes at least a behavior prediction request and a data file including at least a plurality of first encrypted account identifiers, wherein each first encrypted account identifier is encrypted using a first one-way encryption and is associated with a payment account corresponding to a consumer, and further including, for each first encrypted account identifier, a set of consumer characteristics associated with the consumer corresponding to the associated payment account.

In step 606, each set of consumer characteristics included in the received data file may be disguised by a processor (e.g., the processing unit 204) of the first computing system 106 such that the respective set of consumer characteristics is not personally identifiable. In some embodiments, the set of consumer characteristics may include variables and values, and disguising each set of consumer characteristics may include disguising at least the included variables. In step 608, each of the plurality of first encrypted account identifiers and corresponding disguised set of consumer characteristics may be mapped in the memory (e.g., memory 208) of the first computing system 106, to an account identifier of the plurality of account identifiers In step 610, at least each account identifier and mapped first encrypted account identifier may be transmitted, by a transmitter (e.g., the transmitting unit 206) of the first computing system 106 to a second computing system (e.g., the second computing system 108), wherein a receiver (e.g., receiving unit 202) of the second computing system 108 is configured to encrypt each account identifier into a second encrypted account identifier using a second one-way encryption upon receipt. In step 612, a plurality of transaction data entries may be received by the receiving unit 202 of the second computing system 108, wherein each transaction data entry includes data related to a payment transaction including at least a second encrypted account identifier and transaction data.

In step 614, a behavior prediction score corresponding to the behavior prediction request may be calculated, by a processor (e.g., the processing unit 204) of the second computing system 108, for each second encrypted account identifier based on at least the transaction data included in each transaction data entry including the respective second encrypted account identifier. In step 616, the calculated behavior prediction score for each second encrypted account identifier may be transmitted by a transmitter (e.g., transmitting unit 206) of the second computing system 108, wherein the second computing system 108 does not receive any unencrypted account identifiers, any undisguised consumer characteristics, or any personally identifiable information.

In one embodiment, the method 600 may further include: receiving, by a receiver (e.g., receiving unit 202) of a third computing system (e.g., the third computing system 110), at least the calculated behavior prediction score for each second encrypted account identifier and the first encrypted account identifier and disguised set of consumer characteristics mapped to the account identifier corresponding to the respective second encrypted account identifier; and generating, by a processor (e.g., processing unit 204) of the third computing system 110, an algorithm configured to calculate a behavior prediction score corresponding to the behavior prediction request using disguised consumer characteristic values, wherein the generated algorithm is based on at least the behavior prediction score and the disguised set of consumer characteristics for each first encrypted account identifier, wherein the third computing system 110 does not receive any unencrypted account identifiers, any undisguised consumer characteristics, or any personally identifiable information.

In a further embodiment, the method 600 may even further include: calculating, by the processor 204 of the third computing system 110, a behavior prediction score for each first encrypted account identifier by application of the corresponding disguised set of consumer characteristics to the generated algorithm; and transmitting, by a transmitter (e.g., transmitting unit 206) of the third computing system 110, at least the calculated behavior prediction score for each first encrypted account identifier and the corresponding first encrypted account identifier. In another further embodiment, the calculated behavior prediction score for each first encrypted account identifier and the corresponding first encrypted account identifier may be transmitted to the first computing system 106, and the method 600 may further include: receiving, by the receiving unit 202 of the first computing system 106, the calculated behavior prediction score for each first encrypted account identifier; and transmitting, by the transmitting unit 206 of the first computing system 106, the calculated behavior prediction score for each first encrypted account identifier and the corresponding first encrypted account identifier in response to the received transmitted data.

In one further embodiment, the method 600 may also include transmitting, by the transmitting unit 206 of the third computing system 110, at least the generated algorithm. In an even further embodiment, the generated algorithm may be transmitted in response to the received transmitted data. In another even further embodiment, the method 600 may further include: receiving, by the receiving unit 202 of the first computing system 106, the generated algorithm; modifying, by the processor 204 of the first computing system 106, the generated algorithm such that the modified algorithm is configured to calculate a behavior prediction score corresponding to the behavior prediction request using undisguised consumer characteristic values; and transmitting, by the transmitting unit 206 of the first computing system 106, at least the modified algorithm in response to the received transmitted data.

Computer System Architecture

Figure 7:
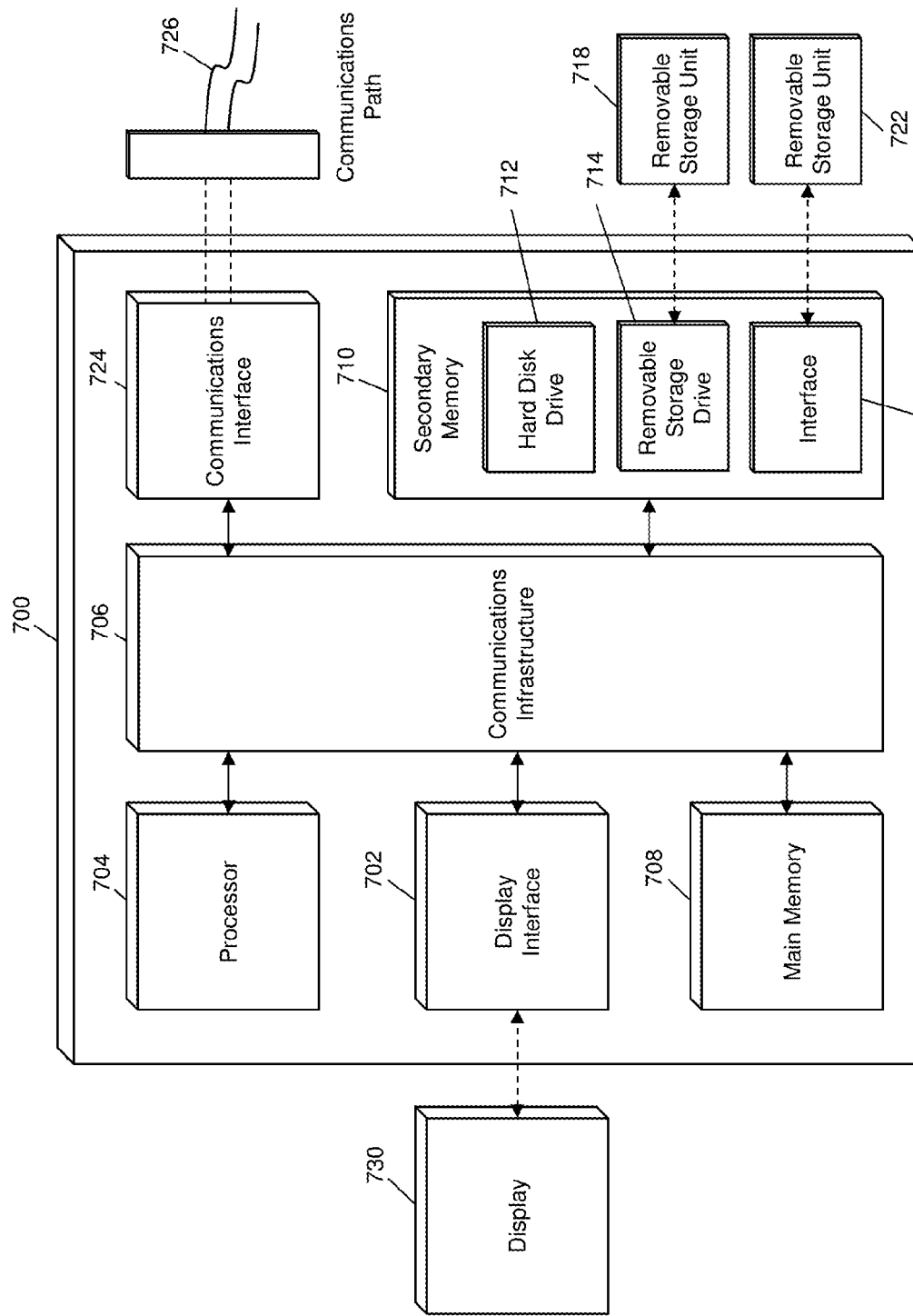
FIG. 7 is a block diagram illustrating a computer system architecture in accordance with exemplary embodiments.

FIG. 7 illustrates a computer system 700 in which embodiments of the present disclosure, or portions thereof, may be implemented as computer-readable code. For example, the first computing system 106, second computing system 108, and third computing system 110 of FIG. 1 and the computing system 200 of FIG. 2 may be implemented in the computer system 700 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3A, 3B, 4A-4C, 5, and 6.

If programmable logic is used, such logic may execute on a commercially available processing platform or a special purpose device. A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 718, a removable storage unit 722, and a hard disk installed in hard disk drive 712.

Various embodiments of the present disclosure are described in terms of this example computer system 700. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 704 may be a special purpose or a general purpose processor device. The processor device 704 may be connected to a communications infrastructure 706, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 700 may also include a main memory 708 (e.g., random access memory, read-only memory, etc.), and may also include a secondary memory 710. The secondary memory 710 may include the hard disk drive 712 and a removable storage drive 714, such as a floppy disk drive, a magnetic tape drive, an optical disk drive, a flash memory, etc.

The removable storage drive 714 may read from and/or write to the removable storage unit 718 in a well-known manner. The removable storage unit 718 may include a removable storage media that may be read by and written to by the removable storage drive 714. For example, if the removable storage drive 714 is a floppy disk drive or universal serial bus port, the removable storage unit 718 may be a floppy disk or portable flash drive, respectively. In one embodiment, the removable storage unit 718 may be non-transitory computer readable recording media.

In some embodiments, the secondary memory 710 may include alternative means for allowing computer programs or other instructions to be loaded into the computer system 700, for example, the removable storage unit 722 and an interface 720. Examples of such means may include a program cartridge and cartridge interface (e.g., as found in video game systems), a removable memory chip (e.g., EEPROM, PROM, etc.) and associated socket, and other removable storage units 722 and interfaces 720 as will be apparent to persons having skill in the relevant art.

Data stored in the computer system 700 (e.g., in the main memory 708 and/or the secondary memory 710) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 700 may also include a communications interface 724. The communications interface 724 may be configured to allow software and data to be transferred between the computer system 700 and external devices. Exemplary communications interfaces 724 may include a modem, a network interface (e.g., an Ethernet card), a communications port, a PCMCIA slot and card, etc. Software and data transferred via the communications interface 724 may be in the form of signals, which may be electronic, electromagnetic, optical, or other signals as will be apparent to persons having skill in the relevant art. The signals may travel via a communications path 726, which may be configured to carry the signals and may be implemented using wire, cable, fiber optics, a phone line, a cellular phone link, a radio frequency link, etc.

The computer system 700 may further include a display interface 702. The display interface 702 may be configured to allow data to be transferred between the computer system 700 and external display 730. Exemplary display interfaces 702 may include high-definition multimedia interface (HDMI), digital visual interface (DVI), video graphics array (VGA), etc. The display 730 may be any suitable type of display for displaying data transmitted via the display interface 702 of the computer system 700, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 708 and secondary memory 710, which may be memory semiconductors (e.g., DRAMs, etc.). These computer program products may be means for providing software to the computer system 700. Computer programs (e.g., computer control logic) may be stored in the main memory 708 and/or the secondary memory 710. Computer programs may also be received via the communications interface 724. Such computer programs, when executed, may enable computer system 700 to implement the present methods as discussed herein. In particular, the computer programs, when executed, may enable processor device 704 to implement the methods illustrated by FIGS. 3A, 3B, 4A-4C, 5, and 6, as discussed herein. Accordingly, such computer programs may represent controllers of the computer system 700. Where the present disclosure is implemented using software, the software may be stored in a computer program product and loaded into the computer system 700 using the removable storage drive 714, interface 720, and hard disk drive 712, or communications interface 724.

Techniques consistent with the present disclosure provide, among other features, systems and methods for maintaining consumer privacy in behavioral scoring. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for maintaining consumer privacy in behavioral scoring, comprising:

storing, in a memory of a first computing system, a plurality of account identifiers, wherein each account identifier is associated with a payment account corresponding to a consumer;

receiving, by a receiver of the first computing system, transmitted data, wherein the transmitted data includes at least a behavior prediction request and a data file including at least a plurality of first encrypted account identifiers, wherein each first encrypted account identifier is encrypted using a first one-way encryption and is associated with a payment account corresponding to a consumer, and further including, for each first encrypted account identifier, a set of consumer characteristics associated with the consumer corresponding to the associated payment account;

disguising, by a processor of the first computing system, each set of consumer characteristics included in the received data file such that the respective set of consumer characteristics is not personally identifiable;

mapping, in the memory of the first computing system, each of the plurality of first encrypted account identifiers and corresponding disguised set of consumer characteristics to an account identifier of the plurality of account identifiers;

transmitting, by a transmitter of the first computing system, at least each account identifier and mapped first encrypted account identifier and corresponding disguised set of consumer characteristics to a second computing system, wherein a receiver of the second computing system is configured to encrypt each account identifier into a second encrypted account identifier using a second one-way encryption upon receipt;

receiving, by the receiver of the second computing system, a plurality of transaction data entries, wherein each transaction data entry includes data related to a payment transaction including at least a second encrypted account identifier and transaction data;

generating, by a processor of the second computing system, an algorithm configured to calculate a behavior prediction score corresponding to the behavior prediction request using disguised consumer characteristic values, wherein the generated algorithm is based on at least the transaction data included in each received transaction data entry and the disguised set of consumer characteristics mapped to the second encrypted account identifier included in the respective transaction data entry, wherein the second computing system does not receive any unencrypted account identifiers, any undisguised consumer characteristics, or any personally identifiable information.

2. The method of claim 1, further comprising:

calculating, by the processor of the second computing system, a behavior prediction score for each first encrypted account identifier by application of the corresponding disguised set of consumer characteristics to the generated algorithm; and transmitting, by a transmitter of the second computing system, at least the calculated behavior prediction score for each first encrypted account identifier and the corresponding first encrypted account identifier.

3. The method of claim 2, wherein the calculated behavior prediction score for each first encrypted account identifier and the corresponding first encrypted account identifier are transmitted to the first computing system, and the method further comprises:

receiving, by the receiver of the first computing system, the calculated behavior prediction score for each first encrypted account identifier; and transmitting, by the transmitter of the first computing system, the calculated behavior prediction score for each first encrypted account identifier and the corresponding first encrypted account identifier in response to the received transmitted data.

4. The method of claim 1, further comprising:

transmitting, by a transmitter of the second computing system, at least the generated algorithm.

5. The method of claim 4, wherein the generated algorithm is transmitted in response to the received transmitted data.

6. The method of claim 4, further comprising:

receiving, by the receiver of the first computing system, the generated algorithm;

modifying, by the processor of the first computing system, the generated algorithm such that the modified algorithm is configured to calculate a behavior prediction score corresponding to the behavior prediction request using undisguised consumer characteristic values; and transmitting, by the transmitter of the first computing system, at least the modified algorithm in response to the received transmitted data.

7. The method of claim 1, wherein the set of consumer characteristics includes variables and values, and disguising each set of consumer characteristics includes disguising at least the included variables.

8. A method for maintaining consumer privacy in behavioral prediction scoring, comprising:

storing, in a memory of a first computing system, a plurality of account identifiers, wherein each account identifier is associated with a payment account corresponding to a consumer;

receiving, by a receiver of a first computing system, transmitted data, wherein the transmitted data includes at least a behavior prediction request and a data file including at least a plurality of first encrypted account identifiers, wherein each first encrypted account identifier is encrypted using a first one-way encryption and is associated with a payment account corresponding to a consumer, and further including, for each first encrypted account identifier, a set of consumer characteristics associated with the consumer corresponding to the associated payment account;

disguising, by a processor of the first computing system, each set of consumer characteristics included in the received data file such that the respective set of consumer characteristics is not personally identifiable;

mapping, in the memory of the first computing system, each of the plurality of first encrypted account identifiers and corresponding disguised set of consumer characteristics to an account identifier of the plurality of account identifiers;

transmitting, by a transmitter of the first computing system, at least each account identifier and mapped first encrypted account identifier to a second computing system, wherein a receiver of the second computing system is configured to encrypt each account identifier into a second encrypted account identifier using a second one-way encryption upon receipt;

receiving, by the receiver of the second computing system, a plurality of transaction data entries, wherein each transaction data entry includes data related to a payment transaction including at least a second encrypted account identifier and transaction data;

calculating, by a processor of the second computing system, a behavior prediction score corresponding to the behavior prediction request for each second encrypted account identifier based on at least the transaction data included in each transaction data entry including the respective second encrypted account identifier; and transmitting, by a transmitter of the second computing system, the calculated behavior prediction score for each second encrypted account identifier, wherein the second computing system does not receive any unencrypted account identifiers, any undisguised consumer characteristics, or any personally identifiable information.

9. The method of claim 8, further comprising:

receiving, by a receiver of a third computing system, at least the calculated behavior prediction score for each second encrypted account identifier and the first encrypted account identifier and disguised set of consumer characteristics mapped to the account identifier corresponding to the respective second encrypted account identifier; and generating, by a processor of the third computing system, an algorithm configured to calculate a behavior prediction score corresponding to the behavior prediction request using disguised consumer characteristic values, wherein the generated algorithm is based on at least the behavior prediction score and the disguised set of consumer characteristics for each first encrypted account identifier, wherein the third computing system does not receive any unencrypted account identifiers, any undisguised consumer characteristics, or any personally identifiable information.

10. The method of claim 9, further comprising:

calculating, by the processor of the third computing system, a behavior prediction score for each first encrypted account identifier by application of the corresponding disguised set of consumer characteristics to the generated algorithm; and transmitting, by a transmitter of the third computing system, at least the calculated behavior prediction score for each first encrypted account identifier and the corresponding first encrypted account identifier.

11. The method of claim 9, wherein the calculated behavior prediction score for each first encrypted account identifier and the corresponding first encrypted account identifier are transmitted to the first computing system, and the method further comprises:
  receiving, by the receiver of the first computing system, the calculated behavior prediction score for each first encrypted account identifier; and
  transmitting, by the transmitter of the first computing system, the calculated behavior prediction score for each first encrypted account identifier and the corresponding first encrypted account identifier in response to the received transmitted data.

12. The method of claim 9, further comprising:
  transmitting, by a transmitter of the third computing system, at least the generated algorithm.

13. The method of claim 12, wherein the generated algorithm is transmitted in response to the received transmitted data.

14. The method of claim 12, further comprising:
  receiving, by the receiver of the first computing system, the generated algorithm;
  modifying, by the processor of the first computing system, the generated algorithm such that the modified algorithm is configured to calculate a behavior prediction score corresponding to the behavior prediction request using undisguised consumer characteristic values; and
  transmitting, by the transmitter of the first computing system, at least the modified algorithm in response to the received transmitted data.

15. The method of claim 8, wherein
  the set of consumer characteristics includes variables and values, and
  disguising each set of consumer characteristics includes disguising at least the included variables.

16. A system for maintaining consumer privacy in behavioral prediction scoring, comprising:
  a first computing system; and
  a second computing system, wherein
  the first computing system includes
    a memory configured to store a plurality of account identifiers, wherein each account identifier is associated with a payment account corresponding to a consumer,
    a receiver configured to receive transmitted data, wherein the transmitted data includes at least a behavior prediction request and a data file including at least a plurality of first encrypted account identifiers, wherein each first encrypted account identifier is encrypted using a first one-way encryption and is associated with a payment account corresponding to a consumer, and further including, for each first encrypted account identifier, a set of consumer characteristics associated with the consumer corresponding to the associated payment account,
    a processor configured to
      disguise each set of consumer characteristics included in the received data file such that the respective set of consumer characteristics is not personally identifiable, and
      map each of the plurality of first encrypted account identifiers and corresponding disguised set of consumer characteristics to an account identifier of the plurality of account identifiers, and
    a transmitter configured to transmit at least each account identifier and mapped first encrypted account identifier and corresponding disguised set of consumer characteristics to a second computing system, wherein a receiver of the second computing system is configured to encrypt each account identifier into a second encrypted account identifier using a second one-way encryption upon receipt,
  the second computing system includes
    a receiver configured to receive a plurality of transaction data entries, wherein each transaction data entry includes data related to a payment transaction including at least a second encrypted account identifier and transaction data, and
    a processor configured to generate an algorithm configured to calculate a behavior prediction score corresponding to the behavior prediction request using disguised consumer characteristic values, wherein the generated algorithm is based on at least the transaction data included in each received transaction data entry and the disguised set of consumer characteristics mapped to the second encrypted account identifier included in the respective transaction data entry, and
  the second computing system does not receive any unencrypted account identifiers, any undisguised consumer characteristics, or any personally identifiable information.

17. The system of claim 16, wherein
  the processor of the second computing system is further configured to calculate a behavior prediction score for each first encrypted account identifier by application of the corresponding disguised set of consumer characteristics to the generated algorithm, and
  the second computing system further includes a transmitter configured to transmit at least the calculated behavior prediction score for each first encrypted account identifier and the corresponding first encrypted account identifier.

18. The system of claim 17, wherein
  the calculated behavior prediction score for each first encrypted account identifier and the corresponding first encrypted account identifier are transmitted to the first computing system,
  the receiver of the first computing system is further configured to receive the calculated behavior prediction score for each first encrypted account identifier, and
  the transmitter of the first computing system is further configured to transmit the calculated behavior prediction score for each first encrypted account identifier and the corresponding first encrypted account identifier in response to the received transmitted data.

19. The system of claim 16, wherein the second computing system further includes a transmitter configured to transmit at least the generated algorithm.

20. The system of claim 19, wherein the generated algorithm is transmitted in response to the received transmitted data.

21. The system of claim 19, wherein
  the receiver of the first computing system is further configured to receive the generated algorithm,
  the processor of the first computing system is further configured to modify the generated algorithm such that the modified algorithm is configured to calculate a behavior prediction score corresponding to the behavior prediction request using undisguised consumer characteristic values, and
  the transmitter of the first computing system is further configured to transmit at least the modified algorithm in response to the received transmitted data.

22. The system of claim 16, wherein
the set of consumer characteristics includes variables and values, and
disguising each set of consumer characteristics includes disguising at least the included variables.

23. A system for maintaining consumer privacy in behavioral prediction scoring, comprising:
a first computing system; and
a second computing system, wherein
the first computing system includes
   a memory configured to store a plurality of account identifiers, wherein each account identifier is associated with a payment account corresponding to a consumer,
   a receiver configured to receive transmitted data, wherein the transmitted data includes at least a behavior prediction request and a data file including at least a plurality of first encrypted account identifiers, wherein each first encrypted account identifier is encrypted using a first one-way encryption and is associated with a payment account corresponding to a consumer, and further including, for each first encrypted account identifier, a set of consumer characteristics associated with the consumer corresponding to the associated payment account,
   a processor configured to
      disguise each set of consumer characteristics included in the received data file such that the respective set of consumer characteristics is not personally identifiable, and
      map, in the memory of the first computing system, each of the plurality of first encrypted account identifiers and corresponding disguised set of consumer characteristics to an account identifier of the plurality of account identifiers, and
   a transmitter configured to transmit at least each account identifier and mapped first encrypted account identifier to a second computing system, wherein a receiver of the second computing system is configured to encrypt each account identifier into a second encrypted account identifier using a second one-way encryption upon receipt,
the second computing system includes
   a receiver configured to receive a plurality of transaction data entries, wherein each transaction data entry includes data related to a payment transaction including at least a second encrypted account identifier and transaction data,
   a processor configured to calculate a behavior prediction score corresponding to the behavior prediction request for each second encrypted account identifier based on at least the transaction data included in each transaction data entry including the respective second encrypted account identifier, and
   a transmitter configured to transmit the calculated behavior prediction score for each second encrypted account identifier, and
the second computing system does not receive any unencrypted account identifiers, any undisguised consumer characteristics, or any personally identifiable information.

24. The system of claim 23, further comprising:
a third computing system, wherein
the third computing system includes
   a receiver configured to receive at least the calculated behavior prediction score for each second encrypted account identifier and the first encrypted account identifier and disguised set of consumer characteristics mapped to the account identifier corresponding to the respective second encrypted account identifier, and
   a processor configured to generate an algorithm configured to calculate a behavior prediction score corresponding to the behavior prediction request using disguised consumer characteristic values, wherein the generated algorithm is based on at least the behavior prediction score and the disguised set of consumer characteristics for each first encrypted account identifier, and
the third computing system does not receive any unencrypted account identifiers, any undisguised consumer characteristics, or any personally identifiable information.

25. The system of claim 24, wherein
the processor of the third computing system is further configured to calculate a behavior prediction score for each first encrypted account identifier by application of the corresponding disguised set of consumer characteristics to the generated algorithm, and
the third computing system further includes a transmitter configured to transmit at least the calculated behavior prediction score for each first encrypted account identifier and the corresponding first encrypted account identifier.

26. The system of claim 24, wherein
the calculated behavior prediction score for each first encrypted account identifier and the corresponding first encrypted account identifier are transmitted to the first computing system,
the receiver of the first computing system is further configured to receive the calculated behavior prediction score for each first encrypted account identifier, and
the transmitter of the first computing system is further configured to transmit the calculated behavior prediction score for each first encrypted account identifier and the corresponding first encrypted account identifier in response to the received transmitted data.

27. The system of claim 23, wherein the third computing system further includes a transmitter configured to transmit at least the generated algorithm.

28. The system of claim 27, wherein the generated algorithm is transmitted in response to the received transmitted data.

29. The system of claim 27, wherein
the receiver of the first computing system is further configured to receive the generated algorithm,
the processor of the first computing system is further configured to modify the generated algorithm such that the modified algorithm is configured to calculate a behavior prediction score corresponding to the behavior prediction request using undisguised consumer characteristic values, and
the transmitter of the first computing system is further configured to transmit at least the modified algorithm in response to the received transmitted data.

30. The system of claim 23, wherein
the set of consumer characteristics includes variables and values, and
disguising each set of consumer characteristics includes disguising at least the included variables.

* * * * *